United States Patent [19]

Hatten et al.

[11] 3,860,053
[45] Jan. 14, 1975

[54] SNOW GRIPPER FOR A VEHICLE TIRE

[75] Inventors: Jostein Hatten, Trysil, Norway; Ole H. Johnsen, Greenwich, Conn.

[73] Assignee: Nordic International Co., Greenwich, Conn.

[22] Filed: Mar. 21, 1973

[21] Appl. No.: 343,202

[52] U.S. Cl. .............................................. 152/226
[51] Int. Cl. ............................................ B60c 27/20
[58] Field of Search........ 152/225, 226, 213 R, 241, 152/233

[56] References Cited
UNITED STATES PATENTS

| | | | |
|---|---|---|---|
| 2,597,458 | 5/1952 | Cummins | 152/225 |
| 2,694,431 | 11/1954 | Howard | 152/225 |
| 2,743,754 | 5/1966 | Maresh | 152/213 R |
| 3,087,527 | 4/1963 | Crider | 152/226 |

*Primary Examiner*—James B. Marbert
*Attorney, Agent, or Firm*—Alfred E. Miller

[57] ABSTRACT

An easily mounted and dismounted ice and snow gripping device having a plurality of spaced snow plates or shoes arranged along the circumference of the tire so that maximum traction can be achieved. The snow plates are connected by means of formed rigid rods and form units that are interconnected with each other by means of diagonally arranged chains. One of the chains is provided with an adjusting device whereby the snow gripper assembly may be adjusted for different diameter tire wheels.

8 Claims, 5 Drawing Figures

PATENTED JAN 14 1975　　　　　　　　　　　　　　　3,860,053

SNOW GRIPPER FOR A VEHICLE TIRE

BACKGROUND OF THE INVENTION

The major drawback of snow tire chains as presently being merchandised is the difficulty in putting them on the driving wheels of the vehicle, as well as dismounting the same when they are no longer necessary. In addition, in many situations, the cross chain links break at points of maximum wear reducing the effectiveness of the chains. Moreover, the broken cross links, during the continued rotation of the wheels, often strike the under carriage of the vehicle and may damage parts thereof as well as creating a loud annoying clatter occasioned upon the striking of metal with metal.

Even if the individual links of the tire chains are fabricated of hardened metal, their cross-section is relatively small so that continued use of the tire chains on asphalt or cement road surfaces will rather rapidly cause a break in at least one of the cross chain links.

With regard specifically to the disadvantage of the prior art snow tire chains, it should be apparent that in order to install the known tire chain, it is necessary to pass the cross links at spaced locations perpendicularly about the circumference of the tire and to ensure that there is chain means circularly arranged on both the front and back of the wheel for holding the spaced cross links in place across the outside periphery of the tire. Often elastic spreaders are fastened to the circular chain on the front of the tire for maintaining the whole assembly tight on the tire.

It is an object of the present invention to provide a snow gripper device for vehicle tires which is easily and rapidly installed and dismounted.

It is a further object of the present invention to provide a snow gripper device having spaced plates or gripping shoes which are formed to conform to the outer periphery of the tire and which are rugged and durable.

It is another object of the present invention to provide a diagonal chain connection and adjusting means for conforming the spaced gripping shoes to the particular tire circumference.

It is a further object of the present invention to provide an alternate snow gripping device in which a metal plate with replaceable gripping heads is secured over the shoes of the units which are fabricated of aluminum.

An object of the present invention is to provide a vehicular snow gripper device which is a slim, compact design resulting in easy storage.

Another object of the present invention is to provide a snow gripper device for vehicles that permits exceptionally fast stopping during an emergency situation.

An object of the present invention is to provide a snow gripper device which is much quieter under operating conditions than presently known tire chains.

The invention will now be more fully described with reference to the accompanying drawings in which.

DESCRIPTION OF THE PREFERRED EMBODIMENT

Figure 1:
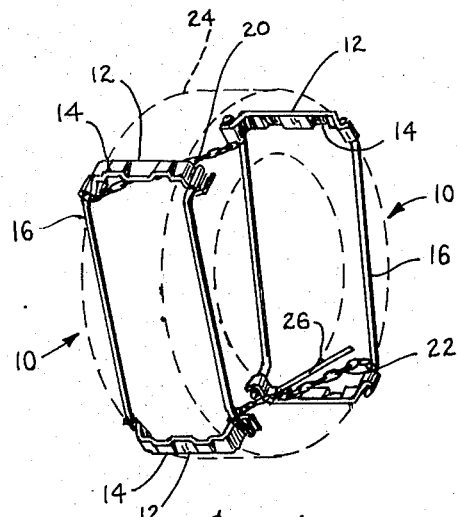
FIG. 1 is a perspective view of the snow gripper device constructed in accordance with the teachings of the present invention.
Figure 2:
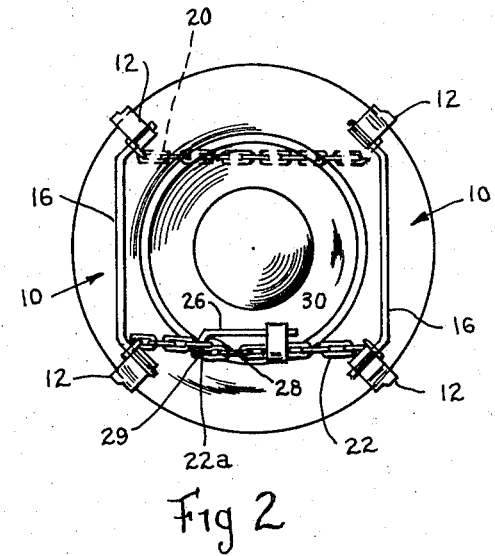
FIG. 2 is a front elevational view of the present invention applied to a tire mounted on a vehicle wheel.
Figure 3:
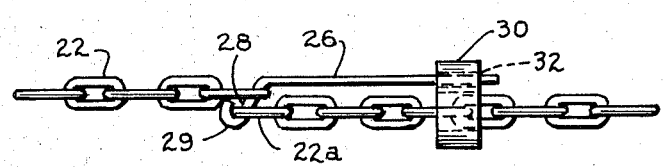
FIG. 3 is an enlarged elevational view, shown in several stages, of the chain adjusting means for selectively shortening or lengthening the chain in order to maintain the snow gripper device taut on the tire.

The snow gripper device for a vehicle tire takes the form of a plurality of units 10. Although only two units 10 are shown, it should be apparent that more than two units, such as three units, can be utilized in the present invention. Each of the units 10 is provided with gripper shoes or plates 12 preferably fabricated of flat hardened steel which is bent to conform to lie relatively flat across the treads of the tire. The gripper plates 12 are provided with raised portions 14 that function to provide additional traction on the road surface. Each of the gripper plates 12 are positioned to be spatially located on the periphery of the tire by means of specially formed rigid connecting rods 16. Thus, as seen in FIG. 2, the present snow gripper device may take the form of two units 10 on opposite sides of wheel 18 which are interconnected by means of diagonally arranged chains 20 and 22. As seen in FIG. 1, the chain 20 is located behind tire 24 on the wheel 18 while the chain 22 is positioned in front of the tire 24. The chain 22 is further provided with an adjustable feature in the form of an elongated rod 26 that has an offset part 28 terminating in a hook 29 that is interconnected with the link 22A of the chain 22. A resilient keeper member 30, for example rubber, is inserted over links of chain 22 and can be moved therealong. The rubber keeper member 30 is provided with a hole 32 through which the free end of elongated rod 26 may be inserted. As seen in FIG. 3, the rod 26 is passed through the selected link in the chain 22 and pivoted downwardly and the end thereof is inserted through the hole 32 of the keeper member 30, and the latter is slid along the chain 22 in order to secure the chain 22 in its adjusted position.

It should be noted that the snow plates or shoes 12 are fabricated to a tempered steel and are spatially located and connected by rigid formed rods. Two, three, or more snow shoe units may be employed depending upon the size of the tire and these units can be interconnected by chains as described hereinabove. The snow shoes or plates have the proper angles relative to the tire whereby the same lie flat across the tread of the tire. Furthermore, it is within the scope of the present invention to use cables or ropes instead of chains for interconnecting the snow shoe units.

Figure 4:
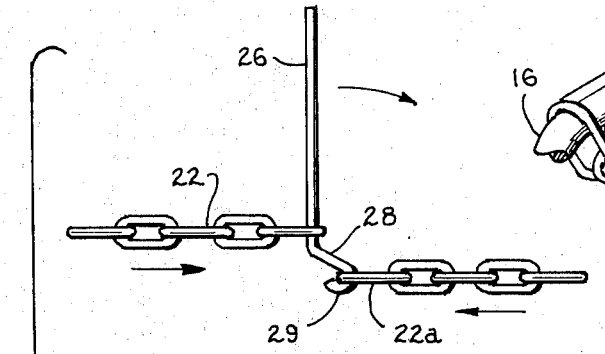
FIG. 4 is a partial view, in perspective, of an alternate embodiment of the device in accordance with the invention.
Figure 4:
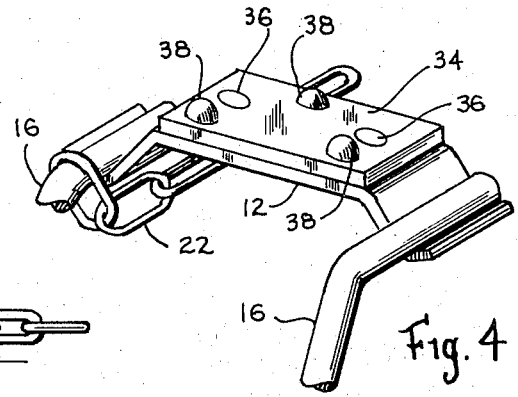
Figure 5:
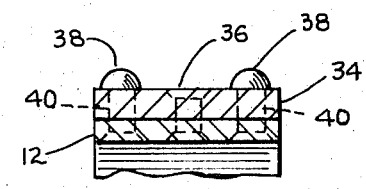
FIG. 5 is a cross-sectional view of the structure shown in FIG. 4.

Referring now to FIGS. 4 and 5, an alternate embodiment of the present invention is shown in which like parts bear the same reference numerals as seen in FIGS. 1-3. In this alternate construction, the plates 12 and connecting rods 16 are fabricated entirely of aluminum in order to reduce the weight factor but retain the strength characteristics of the device. However, in this particular construction, the plates 12 do not function as snow grippers but as a support, since a steel plate 34 is mounted on each of the support plates 12. The plate 34 is fixed to plate 12 by means of countersunk rivets 36. Headed pins 38 are shown mounted in corresponding holes 40 in both plates 12 and 34. The headed pins 38 function as snow and ice grippers, and when they become worn so that they are no longer effective to grip the snow or ice, they may be removed and replaced.

What is claimed is:

1. A snow gripper device for a vehicular tire comprising a plurality of snow plates having a relatively flat road-contacting surface provided with raised portions and arranged at spaced locations on the tire periphery and extending across the tire substantially at right angles to the plane of said tire, a spaced pair of rigid rods connecting adjacent snow plates and extending along the front and rear sidewalls, respectively, of the tire to form a self-supporting snow gripper unit, a first non rigid and non-stretchable connection between snow gripper units on said tire being located behind said tire and engaging the adjacent back sidewall, and a second non-rigid and non-stretchable adjustable connection between said snow gripper units being positioned in front and engaging the front sidewall to firmly hold said device thereon, and in one position of the tire one of said connections is located adjacent to the top of the tire and the other connection is located adjacent to the bottom of the tire in a diagonal plane.

2. A snow gripper device as claimed in claim 1 wherein said first and second non-rigid connections between the snow gripper units are chains.

3. A snow gripper device as claimed in claim 2 wherein said adjustable connection between said snow gripper units is a pivotable elongated rod secured to one end of the chain, said rod being adapted to pass through a selected chain link in order to lengthen or shorten the chain, and means slidably engaging the free end of said rod to removably hold said rod in the selected chain link.

4. A snow gripper device as claimed in claim 1 wherein each of said snow plates is formed to conform to the cross configuration of the outer periphery of the tire.

5. A snow gripper device as claimed in claim 1 wherein said snow plates are fabricated of a tempered steel.

6. A snow gripper device as claimed in claim 1 wherein said snow gripper unit is fabricated of aluminum, and further providing an additional steel plate fastened over each of said snow plates, said steel plate being provided with spaced projections on the outer surface of the steel plate.

7. A snow gripper device as claimed in claim 6 wherein said spaced projections are headed pins.

8. A snow gripper device as claimed in claim 7 wherein said headed pins are removable and replaceable.

* * * * *